United States Patent [19]

Komiya

[11] Patent Number: 5,314,561

[45] Date of Patent: May 24, 1994

[54] METHOD OF PREPARING LAMINATED PACKAGING MATERIAL

[75] Inventor: Yuji Komiya, Tama, Japan

[73] Assignee: Toppan Printing Co., Ltd., Tokyo, Japan

[21] Appl. No.: 74,726

[22] Filed: Jun. 10, 1993

Related U.S. Application Data

[63] Continuation of Ser. No. 757,569, Sep. 11, 1991, abandoned.

[30] Foreign Application Priority Data

Sep. 14, 1990 [JP] Japan .................. 2-244538

[51] Int. Cl.⁵ ............................................. B29C 47/04
[52] U.S. Cl. .......................... 156/244.11; 156/244.23; 156/324
[58] Field of Search ............... 156/244.11, 244.23, 156/324

[56] References Cited

U.S. PATENT DOCUMENTS

| 4,424,256 | 1/1984 | Christensen et al. | 156/244.11 |
| 4,488,924 | 12/1984 | Krieg | 156/244.11 |
| 4,894,291 | 1/1990 | Ofstein | 156/244.11 |

FOREIGN PATENT DOCUMENTS

| 0187512 | 3/1990 | European Pat. Off. |
| 48-14663 | 5/1973 | Japan . |
| 49-034984 | 3/1974 | Japan . |
| 51-48511 | 12/1976 | Japan . |
| 53-42310 | 10/1978 | Japan . |
| 63-64638 | 4/1988 | Japan . |
| 1-62032 | 4/1989 | Japan . |
| 1-62033 | 4/1989 | Japan . |
| 1202436 | 8/1989 | Japan . |
| 30615304 | 3/1991 | Japan . |

*Primary Examiner*—Caleb Weston
*Attorney, Agent, or Firm*—Staas & Halsey

[57] ABSTRACT

A method of preparing a laminated packaging material, comprising forming an extruded coating layer of a thermoadhesive resin on a thin-film layer provided on a substrate, said thin-film layer comprising an inorganic or metal compound and having gas barrier properties. The thin-film layer is laminated thereon with a heat buffer layer in such a way that the substrate may substantially undergo no expansion and constriction, e.g., by dry lamination or non-solvent lamination. Then the extruded coating layer is formed on the heat buffer layer, after an anchor coat layer has been optionally formed on the heat buffer layer. Such a heat buffer layer is preferably selected from the group consisting of a polyester film, a polyethylene film, a polypropylene film and a polyamide film.

14 Claims, No Drawings

METHOD OF PREPARING LAMINATED PACKAGING MATERIAL

This application is a continuation of U.S. patent application Ser. No. 07/757,569, filed Sep. 11, 1991, now abandoned.

BACKGROUND OF THE INVENTION

1. Field of the Invention

This invention relates to a method of preparing a laminated packaging material. More particularly it relates to a method of preparing a laminated packaging material comprising a thin-film layer of an inorganic or metal compound.

2. Description of the Related Art

Packages for food or medical supplies have been hitherto commonly prepared in the form of a pouch, which is a baglike container receptacle. As materials therefor, those mainly comprised of a plastic film are in wide use.

Such packaging materials are required to have various functions and performances according to their contents. In particular, they are often required to have gas barrier properties so that the contents can be prevented from deterioration due to oxidation, the active components in the contents as exemplified by perfume components or pharmaceutical active ingredients can be prevented from permeating or escaping through the package or the contents can be prevented from drying. In order to impart the gas barrier properties to packaging materials, a plastic film that forms a substrate of the packaging material is usually laminated with a layer comprised of a material with good gas barrier properties. A thin-film layer of polyvinyl alcohol, polyvinylidene chloride, metal foil, a metal or an inorganic or metal compound has been used as the material with good gas barrier properties. In particular, a thin-film layer of silicon oxide has an excellent transparency, shows very high gas barrier properties, and yet can be produced at a relatively low cost. Hence, its practical utilization has been researched in variety (Japanese Patent Publications No. 51-48511 and No. 53-12953, Japanese Utility Model Publications No. 52-3418 and No. 52-24608, etc.).

The transparent thin-film layer of an inorganic or metal compound as disclosed in the above Japanese Patent Publication No. 51-48511, Japanese Utility Model Publication No. 52-24608, etc., however, is comprised of so thin a glassy layer that fine cracks tend to occur, which seriously tend to occur especially when heated. This is presumed to result from the phenomenon that the substrate on which the transparent thin-film layer is formed undergoes expansion and contraction by heat and the transparent thin-film layer can not follow this expansion and contraction. Occurrence of such cracks results in a serious lowering of the gas barrier properties of the packaging material.

An occasion on which the thin-film layer of an inorganic or metal compound is heated can be met when a thermoadhesive resin layer is formed on the thin-film layer in order for the packaging material to be endowed with thermal adhesion properties. As a function required in packaging materials, packaging materials must have the thermal adhesion properties so that the packaging materials can be readily worked when they are formed into baglike packages. In order for packaging materials to be endowed with the thermal adhesion properties, the substrate for a package is laminated with a thermoadhesive resin film (also called a sealing medium) in usual instances. In such instances, the sealing medium usually gives a layer having the largest thickness among the layers that constitute a package, and also gives a layer that imparts strength and flexibility to the packaging material and serves as a main component layer of the package. A method for its lamination may include a method in which the substrate is laminated with the thermoadhesive resin film (the sealing medium) previously prepared, and a method in which a thermoadhesive resin is directly extruded in the form of a film onto the substrate to effect lamination to form the sealing medium, i.e., what is called the extrusion coating. In the method in which the substrate is laminated with the sealing medium, a substrate on which the thin-film layer of an inorganic or metal compound has been formed and the thermoadhesive resin film (sealing medium) previously prepared may be laminated using an adhesive, or the substrate and the sealing medium are laminated interposing between them a thermoadhesive resin coating formed by extrusion. The latter enables easy formation of the sealing medium in a large thickness, and is a preferred method. This is because, in the method in which the substrate and the sealing medium are laminated interposing an adhesive, the presence of the adhesive may cause an increase in rigidity of sheets, a decrease in flexibility thereof, and a lowering of transparency.

Almost all of the packages making use of metal foil which are commercially available at present are comprised of a sealing medium formed by extrusion coating of the thermoadhesive resin onto a metal foil.

However, as previously stated, in the direct extrusion coating of the thermoadhesive resin onto the thin-film layer, the substrate may be expanded because of the mechanical tension applied when coating is carried out and the heat of molten thermoadhesive resin, to cause occurrence of fine cracks in the thin-film layer. In addition, the occurrence of cracks may be promoted because the thermoadhesive resin layer formed by extrusion coating and the substrate heated undergo constriction as they are cooled. As a result, the gas barrier properties of the package may be greatly lowered. This has been a problem unsolved.

SUMMARY OF THE INVENTION

An object of the present invention is to provide a method of preparing a packaging material that may cause no cracks to occur in the thin-film layer of an inorganic or metal compound even when the thermoadhesive resin layer is formed by extrusion coating, and has superior gas barrier properties.

Another object of the present invention is to provide a method of preparing a packaging material comprised of a thermoadhesive resin layer capable of giving a superior adhesion strength.

According to an embodiment, the present invention provides a method of preparing a laminated packaging material, comprising forming an extruded coating layer of a thermoadhesive resin on a thin-film layer provided on a substrate, said thin-film layer comprising an inorganic or metal compound and having gas barrier properties; wherein said thin-film layer is laminated thereon with a heat buffer layer in such a way that the substrate may substantially undergo no expansion and constriction, and then said extruded coating layer is formed on said heat buffer layer.

According to another embodiment, the present invention provides a method of preparing a laminated packaging material, comprising forming an extruded coating layer of a thermoadhesive resin on a thin-film layer provided on a substrate, said thin-film layer comprising an inorganic or metal compound and having gas barrier properties; wherein said thin-film layer is laminated thereon with a heat buffer layer in such a way that the substrate may substantially undergo no expansion and constriction, an anchor coat layer is formed on said heat buffer layer, and thereafter said extruded coating layer is formed on said anchor coat layer.

DETAILED DESCRIPTION OF THE INVENTION

According to the method of the present invention for preparing a packaging material, the heat buffer layer obstructs the transfer of the heat coming from the extruded coating layer of a thermoadhesive resin provided thereon and also prevents the expansion and contraction of the substrate on which the thin-film layer is formed, so that no cracks are produced in the thin-film layer. Thus, the packaging material prepared by the method of the present invention can have a crack-free thin-film layer and hence can show good gas barrier properties. It can also prevent the contents in the package from undergoing oxidation deterioration or the active components from permeating or escaping through the package. Moreover, the anchor coat layer optionally provided between the heat buffer layer and the thermoadhesive resin layer is effective for giving a superior peel strength.

As the substrate used in the present invention, a film-like or sheetlike plastic material on which the thin-film layer of an inorganic or metal compound can be formed may preferably be used. Such a plastic material may include polyesters, stretched polypropylene, unstretched polypropylene, polyethylene, and polyamides such as stretched nylon. Of these, polyester, in particular, polyethylene terephthalate film can be most preferably used taking account of adhesion properties of the thin-film layer, transparency, working properties, and cost.

The inorganic or metal compound that forms the thin-film layer in the present invention may be appropriately selected from various inorganic or metal compounds having gas barrier properties when formed into a thin film. Usable compounds include, for example, oxides, nitrides, sulfides or fluorides of inorganics or metals such as silicon, magnesium, indium, aluminum, titanium, etc. They may more specifically include $Si_xO_y$ (x=0, 1 or 2; Y=1, 2 or 3), $Al_2O_3$, $Si_3N_4$, $ZnS$, $MgO$ and $MgF_2$. In particular, compounds that turns transparent when formed into a thin film are preferred in view of the convenience that the contents of the package can be seen through.

The thin-film layer of such a compound can be formed on the substrate by a usual process such as vacuum deposition, ion plating, sputtering, plasma deposition, electron beam process or CVD (chemical vapor deposition). The thickness of the thin-film layer may vary depending on the types of the inorganic or metal compound. In the case of silicon oxide, the layer must be at least 800 Å thick in order to give the intended gas barrier properties. The layer may preferably be provided in a thickness of not less than 900 Å. In order to ensure the flexibility required as the packaging material, it may preferably be provided in a thickness of not more than 2,000 Å. In the case of aluminum oxide, the layer may be provided in a thickness of at least 400 Å, and preferably in a thickness of not less than 450 Å and not more than 600 Å.

In the present invention, this thin-film layer of the inorganic or metal compound is laminated thereon with a heat buffer layer.

This heat buffer layer is a layer for preventing the substrate from its expansion and contraction due to the heat coming from the extruded coating layer of the thermoadhesive resin described later. A plastic film made of a material having satisfactory heat buffer properties and formed in a sufficient thickness is used. Stated specifically, polyester films such as polyethylene terephthalate film, polyethylene films, polypropylene films, and polyamide films such as nylon films can be used. The film must be at least 10 μm in thickness, and should preferably be not less than 12 μm.

When the heat buffer layer is laminated to the thin-film layer formed on the substrate, it must be laminated in such a way that the substrate may substantially undergo no expansion and constriction. In other words, when the heat buffer layer is laminated, the expansion and contraction of the substrate must be controlled to such an extent that no cracks may be produced in the thin-film layer. Hence, at the time of the lamination, it is necessary to control the conditions that may cause a great expansion and contraction of the substrate, e.g., to make control so as not to excessively increase the tension of the substrate or not to be operated at high temperatures. From such viewpoints, although it may be possible to form the heat buffer layer by extrusion coating or a process requiring heating as exemplified by heat lamination if heating temperatures are duly controlled, the heat buffer layer should preferably be formed by the dry lamination making use of a solvent type adhesive, the non-solvent lamination making use of a non-solvent type adhesive, or the like.

In the present invention, the extruded coating layer of a thermoadhesive resin is formed on this heat buffer layer. This coating layer usually acts as a bonding layer through which the laminate comprised of the inorganic or metal compound thin-film layer and the heat buffer layer and the thermoadhesive resin film (sealing medium) are laminated. In some instances, this extruded coating layer may be formed on the laminate comprised of the substrate, the inorganic or metal compound thin-film layer and the heat buffer layer so that the extruded coating layer itself can serve as a sealing medium. The thermoadhesive resin used for such purpose may be appropriately selected from various thermoadhesive resins according to the properties required as packages. Such a thermoadhesive resin may most commonly include polyethylene. In some instances, it is also possible to use ionomer resins for the purpose of imparting hot-sealing properties, or to use ethylene/vinyl acetate copolymer resins for the purpose of imparting heat-sealing properties.

The extrusion coating of the thermoadhesive resin can be carried out by heating the thermoadhesive resin into a molten state, and extruding from a T-die the molten resin in the form of a film with a given thickness, to the interface between the bodies to be bonded, i.e., the interface between the sealing medium and the laminate comprised of the substrate, the inorganic or metal compound thin-film layer and the heat buffer layer, followed by contact bonding and then cooling to effect lamination. In the instance where the extruded coating layer itself is made to serve as a sealing medium as described above, the extrusion coating can be carried out by extruding the molten resin onto the bodies to be laminated, i.e., onto the laminate comprised of the substrate, the inorganic or metal compound thin-film layer and the heat buffer layer, followed by contact bonding and then cooling to effect lamination.

The temperature conditions under which the thermoadhesive resin used in the extrusion coating is melted have a great influence on its adhesion properties. An excessively low resin temperature may bring about no sufficient adhesion strength (or peel strength) for the extruded coating layer laminated. Thus the extrusion coating should preferably be carried out at a temperature of 300° C. or above in the case when the thermoadhesive resin comprises polyethylene, and 280° C. or above in the case when the thermoadhesive resin comprises an ionomer resin.

The extruded coating layer may preferably be in a thickness of 50 µm at maximum in view of working efficiency. When it is desired to form a layer with a thickness larger than this, it is preferred that an additional film (the sealing medium or the like) is laminated using the extruded coating layer as a bonding layer as described above or the extruded coating layer is formed in two or more layers.

In the present invention, at least the above substrate, inorganic or metal compound thin-film layer, heat buffer layer, and extruded coating layer comprising the thermoadhesive resin are successively laminated. Other layer may also be laminated if necessary. For example, a conventional anchor coat layer may be provided between the heat buffer layer and the extruded coating layer. The anchor coat layer thus provided can bring about an increase in adhesion strength (or peel strength) between the both layers. An ionomer resin layer may also be laminated to the extruded coating layer for the purpose of imparting hot sealing properties, or an ethylene/vinyl acetate copolymer resin layer for the purpose of imparting low-temperature heat-sealing properties.

All the above layers used in the present invention may be made transparent to give a transparent packaging material. As will be obviously noted, a print layer may also be formed at a suitable position. It is also optional to add paper as a layer component so that "stiffness" can be imparted to the packaging material, or to color some of the layers by mixing therein a pigment or the like.

In the present invention, the heat buffer layer is provided onto the inorganic or metal compound thin-film layer so that the thin-film layer can be protected from the heat coming from the extruded coating layer formed thereon. An additional extruded coating layer may also be formed on the substrate on its side on which no thin-film layer is formed. Formation of such an additional layer is also effective for preventing cracks from being produced in the thin-film layer. This is because the substrate itself can function as the heat buffer layer and hence the expansion and contraction of the surface of the substrate on its side on which the thin-film layer is formed can be made not so great as to produce no cracks in the thin-film layer. Thus, the additional extruded coating layer provided on the back of the substrate can bring about an improvement in mechanical properties of the packaging material.

The packaging material according to the present invention, thus obtained, can be made into suitable forms, e.g., can be formed into a bag, and put into use. The packaging material of the present invention can be handled in the same manner as conventional packaging materials.

The present invention will be described below in greater detail by giving Examples.

EXAMPLE 1

On a substrate comprising a biaxially stretched polyethylene terephthalate film (trade name: P-11; available from Toray Industries, Inc; thickness: 12 µm), a silicon oxide thin-film layer was formed by vacuum deposition in a thickness of 1,000 Å. On this silicon oxide thin-film layer, a heat buffer layer comprising a biaxially stretched polyethylene terephthalate film (trade name: E-5200; available from Toyobo Co., Ltd.; thickness: 12 µm) was formed by dry lamination. Subsequently, on this heat buffer layer, a primer (an anchoring agent) (trade name: AD-506S; available from Toyo Morton Co.) was coated to form an anchor coat layer, and thereafter a low-density polyethylene was extruded from a T-die and laminated to the anchor coat layer in a thickness of 45 µm (processing speed: 40 m/min; line tension: 5 kg).

Oxygen permeability of the resulting laminate was measured by the MOCON method using OX-TRAN 10/50A (produced by Modern Controls, Inc.) as an oxygen permeability measuring apparatus. Results obtained are shown in Table 1. Peel strength between the heat buffer layer and thermoadhesive resin layer of the laminate was also measured using Strograph R (trade name: produced by Toyo Seiki Seisaku-Sho, Ltd.) under conditions of 25° C. and 100% RH. Average values of the measurement results are shown in Table 2. The peel strength was tested by a method in which a striplike laminate of 15 mm in width is used as a test piece to measure the load necessary for separating the heat buffer layer and the thermoadhesive resin layer in T-peel or in the direction of 180° at a rate of 100 mm/min.

EXAMPLE 2

A laminate was obtained in the same procedure as in Example 1 except that an ethylene/ethyl acrylate copolymer (ethyl acrylate content: 6% by weight) was used as the thermoadhesive resin and no anchor coat layer was formed.

Oxygen permeability and peel strength were also measure on the resulting laminate in the same manner as in Example 1 to obtain the results as shown in Table 1 and Table 2, respectively.

In Table 1, results on the oxygen permeability of a control are also shown, which is a laminate comprised of a substrate and a silicon oxide thin-film layer formed thereon but no thermoadhesive resin layer formed thereafter (i.e., a laminate in which the silicon oxide thin-film layer is not heated and therefore the initial gas barrier properties is retained).

TABLE 1

| Example | Processing temperature | Oxygen permeability* $(cc/m^2 \cdot day \cdot atm)$ | | | |
|---------|-----------------------|------|------|-----|-----|
| Control | No thermoadhesive resin layer | 1.1 | 1.0 | 1.3 | 1.1 |
| 1 | 320° C. | 1.1 | 0.9 | — | — |
| 2 | 280° C. | 1.3 | 1.1 | — | — |

*In control, results on four samples; in Examples 1 and 2, results on two samples.

TABLE 2

| | Peel strength (g/15 mm width) | | | |
|---|---|---|---|---|
| | T-peel | | 180°-peel | |
| Example | After 3 days | After 14 days | After 3 days | After 14 days |
| 1 | >1,000 | >1,000 | >1,000 | >1,000 |
| 2 | 260 | 380 | 370 | 550 |

As is clear from the results shown in Tables 1 and 2, there is no decrease in the gas barrier properties, in other words, no cracks are produced in the inorganic or metal compound thin-film layer even at a processing temperature higher than 250° C., when the heat buffer layer is provided on the inorganic or metal compound thin-film layer as in the present invention and then the thermoadhesive resin is extrusion-coated thereon. In particular, as is also seen from the results, a satisfactory peel strength and a practically useful packaging material can be obtained when the anchor coat layer is provided.

COMPARATIVE EXAMPLES 1 to 13

On a substrate comprising a biaxially stretched polyethylene terephthalate film (trade name: P-11; available from Toray Industries, Inc; thickness: 12 μm), a silicon oxide thin-film layer was formed by vacuum deposition in a thickness of 1,000 Å. (In respect of Comparative Example 8, the silicon oxide thin-film layer was formed after the same anchor coat layer as in Example 1 had been formed.) To this silicon oxide thin-film layer, the following thermoadhesive resins were each extruded from a T-die and directly laminated in a thickness of 45 μm (processing speed: 40 m/min; line tension: 10 kg in Comparative Examples 6 and 12, and 5 kg in others). Oxygen permeability of the resulting laminates was measured in the same manner as in Example 1. Results obtained are shown in Table 3. Peel strength between the silicon oxide thin-film layer and thermoadhesive resin layer of the laminate was also measured in the same manner as in Example 1. Average values of the results on the measurement carried out three times are shown in Table 4.

Thermoadhesive Resins Used

Comparative Examples 1 to 3:
Ethylene/methacrylic acid copolymer resin (methacrylic acid content: 11% by weight)
Comparative Example 4:
Ionomer resin (metal component: zinc)
Comparative Examples 5 to 7:
Ethylene/methacrylic acid copolymer resin (methacrylic acid content: 6% by weight)
Comparative Example 8:
Low-density polyethylene
Comparative Examples 9 to 13:
Low-density polyethylene
Remarks: The low-density polyethylenes used in Comparative Example 8 and Comparative Examples 9 to 13, respectively, have different resin grades.

TABLE 3

| Comparative example | Processing temperature | Oxygen permeability* (cc/m² · day · atm) | | | |
|---|---|---|---|---|---|
| 1 | 290° C. | 17 | 16 | — | — |
| 2 | 250° C. | 0.8 | — | — | — |
| 3 | 230° C. | 0.6 | — | — | — |
| 4 | 300° C. | 18 | 15 | — | — |
| 5 | 250° C. | 2.4 | — | — | — |
| 6 | 250° C. | 9.6 | — | — | — |
| 7 | 230° C. | 0.8 | 0.9 | 1.0 | 0.9 |
| 8 | 320° C. | 26 | 29 | — | — |
| 9 | 290° C. | 26 | — | — | — |
| 10 | 270° C. | 18 | — | — | — |
| 11 | 250° C. | 1.1 | — | — | — |
| 12 | 250° C. | 33 | — | — | — |
| 13 | 230° C. | 0.6 | — | — | — |

*In Comparative Examples 1, 4 and 8, results on two samples; in Comparative Example 7, four samples; and in others, one sample.

TABLE 4

| | Peel strength (g/15 mm width) | | | |
|---|---|---|---|---|
| | T-peel | | 180°-peel | |
| Comparative example | After 3 days | After 14 days | After 3 days | After 14 days |
| 1 | 190 | >1,000 | — | 620 |
| 2 | 100 | — | 170 | — |
| 3 | 70 | — | 120 | — |
| 4 | 170 | 210 | — | >1,000 |
| 5 | 100 | 100 | — | 180 |
| 6 | 130 | — | 200 | — |
| 7 | 140 | — | 200 | — |
| 8 | 350 | 300 | — | 550 |
| 9 | >1,000 | — | >1,000 | — |
| 10 | 160 | — | 230 | — |
| 11 | 10 | — | 30 | — |
| 12 | 10 | — | 10 | — |
| 13 | 10 | — | 10 | — |

As is clear from the results shown in Tables 3 and 4, there is a decrease in the gas barrier properties, in other words, cracks are produced in the inorganic or metal compound thin-film layer at a processing temperature higher than 250° C. in the extrusion coating. In particular, there is a serious decrease in the gas barrier properties when the extrusion coating is carried out at a high line tension (Comparative Examples 6 and 12). No satisfactory peel strength nor practically useful packaging material can be obtained at a processing temperature not higher than 250° C. which is the temperature at which no cracks are produced in the inorganic or metal compound thin-film layer.

EXAMPLE 3

This Example is an example for preparing a practical laminated packaging material according to the method of the present invention.

First, a silicon oxide thin-film layer of 1,500 Å thick is formed by vacuum deposition on one side of a first polyethylene terephthalate (PET) film (12 μm thick). Next, on one side of a second PET film (12 μm thick), a urethane adhesive is coated as an adhesive for dry lamination. This second PET film is superposed on the first PET film in such a way that the adhesive surface of the former comes into contact with the silicon oxide thin-film layer of the first PET film, to laminate them by dry lamination.

Next, the laminate thus obtained is laminated to a third PET film having on its one side a print layer while polyethylene (S-PE) is extruded in the form of a 12 μm thick film to the interface between the second PET film on its side on which no urethane adhesive layer is formed and the print layer formed on the third PET film.

Finally, polyethylene is extrusion-coated in a thickness of 50 μm on the first PET film on its surface on which no silicon oxide thin-film layer is formed.

Thus, a laminated packaging material having the following layer constitution can be obtained. Third PET film/Print layer/S-PE/Second PET film/ Urethane adhesive/SiO first PET film/PE.

As having been described above, according to the present invention, no cracks are produced in the inorganic or metal compound thin-film layer even when the thermoadhesive resin is extrusion-coated on the substrate having the inorganic or metal compound thin-film layer, and hence satisfactory gas barrier properties can be obtained, thus making it possible to protect the contents. In addition, since the packaging material to be obtained can be made transparent, the contents can be seen through, making it possible to put the product into wide use as packaging materials.

What is claimed is:

1. A method of preparing a laminated packaging material, comprising the steps of:
    forming a thin-film layer on a substrate, said thin-film layer comprising an inorganic or metal compound and having gas barrier properties;
    laminating a heat buffer layer on said thin-film layer in such a way that the substrate undergoes no expansion and constriction during the lamination step; and
    forming an extruded coating layer on said heat buffer layer.

2. The method of claim 1, wherein said heat buffer layer is laminated to the thin-film layer by dry lamination or non-solvent lamination.

3. The method of claim 1, wherein said heat buffer layer is selected from the group consisting of a polyester film, a polyethylene film, a polypropylene film and a polyamide film.

4. The method of claim 1, wherein said thin-film layer is transparent.

5. The method of claim 4, wherein said thin-film layer comprises silicon oxide.

6. The method of claim 1, wherein an extruded coating layer of a thermoadhesive resin is further formed on the substrate on its side on which said thin-film layer is not formed.

7. A method of preparing a laminated packaging material, comprising the steps of:
    forming a thin-film layer on a substrate, said thin-film layer comprising an inorganic or metal compound and having gas barrier properties;
    laminating a heat buffer layer on said thin-film layer in such a way that the substrate undergoes no expansion and constriction during the lamination step;
    forming an anchor coat layer on said heat buffer layer; and
    forming an extruded coating layer on said anchor coat layer.

8. The method of claim 7, wherein said heat buffer layer is laminated to the thin-film layer by dry lamination or non-solvent lamination.

9. The method of claim 7, wherein said heat buffer layer is selected from the group consisting of a polyester film, a polyethylene film, a polypropylene film and a polyamide film.

10. The method of claim 7, wherein said thin-film layer is transparent.

11. The method of claim 10, wherein said thin-film layer comprises silicon oxide.

12. The method of claim 7, wherein an extruded coating layer of a thermoadhesive resin is further formed on the substrate on its side on which said thin-film layer is not formed.

13. The method of claim 1, wherein said step of forming said extruded coating layer includes a substep of extruding said extruded coating layer onto said heat buffer layer at an extrusion temperature higher than 250° C.

14. The method of claim 7, wherein said step of forming said extruded coating layer includes a substep of extruding said extruded coating layer onto said anchor coat layer at an extrusion temperature higher than 250° C.

* * * * *